United States Patent
Poe et al.

(10) Patent No.: US 8,667,157 B2
(45) Date of Patent: Mar. 4, 2014

(54) HARDWARE BUS REDIRECTION SWITCHING

(75) Inventors: Daryl T Poe, Fort Collins, CO (US); Anthony M. DiMarzio, Jr., Wayne, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 13/193,964

(22) Filed: Jul. 29, 2011

(65) Prior Publication Data
US 2013/0031264 A1    Jan. 31, 2013

(51) Int. Cl.
*G06F 15/16* (2006.01)
(52) U.S. Cl.
USPC ............ 709/230; 709/217; 709/226; 709/227
(58) Field of Classification Search
USPC .................. 709/217, 226, 227, 230
See application file for complete search history.

(56) References Cited

U.S. PATENT DOCUMENTS

| | | | |
|---|---|---|---|
| 6,085,247 A * | 7/2000 | Parsons et al. ............ | 709/227 |
| 7,185,136 B2 | 2/2007 | Zarns | |
| 2007/0233869 A1 * | 10/2007 | Jodh et al. ................ | 709/226 |
| 2008/0201485 A1 * | 8/2008 | Patwardhan et al. ......... | 709/238 |
| 2009/0150550 A1 | 6/2009 | Barreto et al. | |
| 2009/0248885 A1 * | 10/2009 | Patwardhan et al. ......... | 709/230 |
| 2010/0131669 A1 * | 5/2010 | Srinivas et al. ............. | 709/233 |
| 2012/0158822 A1 * | 6/2012 | Dai et al. .................... | 709/203 |

OTHER PUBLICATIONS

"HP t5745 Flexible Series Thin Client," Nov. 2009, 2 pages, Hewlett-Packard Development Company, L.P.
"Windows Embedded Compact 7: RemoteFX and Remote Experience Thin Client Integration," 2010, 10 pages, Microsoft Corporation.
Harding, Christoph, "Kiosk Mode and Automated USB Redirection," Aug. 30, 2010, 2 pages, Available at: <thatsmyview.net/2010/08/30/kiosk-mode-and-automated-usb-redirection/>.

* cited by examiner

*Primary Examiner* — Phuoc Nguyen
(74) *Attorney, Agent, or Firm* — Scott Pojunas

(57) ABSTRACT

Example embodiments relate to hardware bus redirection switching. In example embodiments, a computing device receives a selection of a new remote desktop protocol to be used for communication with a remote server. The computing device may then selectively enable hardware bus redirection for the new remote desktop protocol based on whether the new protocol supports hardware bus redirection.

15 Claims, 3 Drawing Sheets

HARDWARE BUS REDIRECTION SWITCHING

BACKGROUND

In a remote desktop environment, a server runs a desktop session locally and provides the outputted graphics information to a remote client for display. For example, a user of a personal computing device, such as a laptop, desktop, or thin client may connect to the server and subsequently receive a stream of graphics information representing the desktop session managed by the server. In response, the client may output the graphics on an available display and subsequently process input from the user for transmission back to the server. This process continues, with the server transmitting the graphics stream and the client transmitting input events. In this manner, the client device may interact with a user interface as if it were available locally, even though the desktop session is managed by the server.

BRIEF DESCRIPTION OF THE DRAWINGS

The following detailed description references the drawings, wherein.

DETAILED DESCRIPTION

Figure 1:
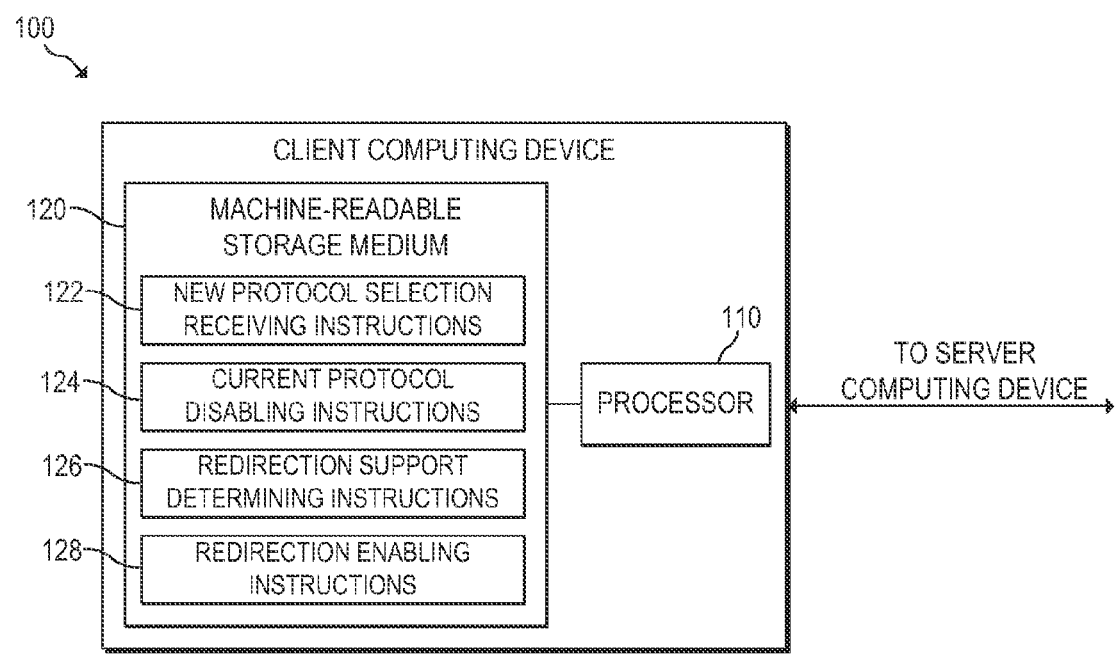
FIG. 1 is a block diagram of an example client computing device for hardware bus redirection switching based on a selection of a new remote desktop protocol.

As detailed above, remote desktop environments enable a user to interact with a desktop processed by a server as if it were a local desktop. In order to improve the user experience, many remote desktop solutions include features designed to maintain the illusion that the user is interacting with a local desktop. One such feature is called hardware bus redirection, which allows a user to interact with a locally-connected Universal Serial Bus (USB), Firewire, or other similar device within the remote desktop session.

For example, when using USB redirection, a user connects a USB device to the local device, which may be a thin client or similar device. The client and server then communicate regarding the availability of a local USB device. When a user requests access to the USB device from within the remote desktop session, the server directs the request to the client, which accesses the local USB device and forwards the requested data to the server. Finally, the server returns the data to the client via the remote desktop session. In this manner, the user may access the USB device within the remote desktop session as if it were directly plugged into the server.

Some remote desktop environments support multiple protocols. For example, an administrator or other entity may be able to choose between the Microsoft Remote Desktop Protocol (ROP), VMware View, Citrix Independent Computing Architecture (ICA), or a number of other protocols. In such systems, the methods for hardware bus redirection for each protocol may be incompatible, such that only a single protocol can use hardware bus redirection at a given time. This makes it challenging for a system administrator to reliably switch between protocols, while still maintaining the functionality of hardware bus redirection for the currently-selected protocol.

Furthermore, in some situations, the administrator may desire to provide for local access of hardware bus devices when using a given protocol. For example, a given protocol may not support hardware bus redirection, such that only local access of the devices is permitted. Alternatively, the administrator may desire to disable hardware bus redirection entirely, even when a given protocol supports redirection. Again, it is often challenging for the system administrator to reliably manage hardware bus redirection to provide for local access of the devices.

To address these issues, example embodiments disclosed herein provide for a technique to reliably manage hardware bus redirection for multiple protocols. For example, in some embodiments, a computing device receives a selection of a new remote desktop protocol to be used. In response, the computing device may identify the current protocol and disable hardware bus redirection for that protocol. The computing device may then determine whether hardware bus redirection is supported for the new protocol and, if so, enable hardware bus redirection for that protocol. Alternatively, when hardware bus redirection is not supported for the protocol, the device may enable local access of the devices, rather than enabling hardware bus redirection.

In this manner, example embodiments disclosed herein allow for support of multiple remote desktop protocols and, in addition, allow for switching of hardware bus redirection for those protocols. In this manner, the system reliably switches between methods of hardware bus redirection in a manner that avoids conflicts between protocols and is largely transparent to the system administrator. Furthermore, the system transparently enables local access of devices when hardware bus redirection is not supported for the protocol or when the administrator has locked the system to local access only. Additional embodiments and advantages of such embodiments will be apparent to those of skill in the art upon reading and understanding the following description.

Referring now to the drawings, FIG. 1 is a block diagram of an example client computing device 100 for hardware bus redirection switching based on a selection of a new remote desktop protocol. Client computing device 100 may be, for example, a notebook computer, a desktop computer, an all-in-one system, a thin client, a workstation, a tablet computing device, a mobile phone, or any other computing device suitable for execution of the functionality described below. In the implementation of FIG. 1, client computing device 100 includes processor 110 and machine-readable storage medium 120.

Processor 110 may be one or more central processing units (CPUs), microprocessors, and/or other hardware devices suitable for retrieval and execution of instructions stored in machine-readable storage medium 120. Processor 110 may fetch, decode, and execute instructions 122, 124, 126, 128 to implement the procedure for hardware bus redirection switching, as described below. As an alternative or in addition to retrieving and executing instructions, processor 110 may include one or more electronic circuits comprising a number of electronic components for performing the functionality of one or more of instructions 122, 124, 126, 128.

Machine-readable storage medium 120 may be any electronic, magnetic, optical, or other physical storage device that contains or stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for switching between hardware bus redirection for multiple protocols.

New protocol selection receiving instructions 122 may be configured to receive a selection of a new remote desktop protocol to be used by client computing device 100 for communication with a remote server. The remote desktop protocol may be the Microsoft Remote Desktop Protocol (RDP), the Citrix Independent Computing Architecture (ICA), or VMware View, to name a few examples.

As one example implementation, new protocol selection receiving instructions 122 may present a user interface that allows an administrator or other user to select a new remote desktop protocol. For example, the interface may display a list of all supported protocols in a drop-down menu or other interface element and thereby allow the user to select the new protocol to be used. Alternatively, the selection of the protocol may be received in a profile to be used by the client. The profile may be a file or set of files that including settings to be used by the client, including an identification of the remote desktop protocol.

Regardless of the method by which the administrator or other user selects the new protocol, processor 110 may then execute current protocol disabling instructions 124. Disabling instructions 124 may first identify the protocol currently using hardware bus redirection, such as USB redirection, Firewire redirection, or redirection of any other type of hardware bus. For example, disabling instructions 124 may query a function provided for each protocol to determine whether the protocol is using hardware bus redirection. After identifying the protocol that is currently using hardware bus redirection, disabling instructions 124 may then disable hardware bus redirection for that protocol.

In disabling hardware bus redirection, disabling instructions 124 may perform a series of operations, which may be customized for each protocol. For example, the steps for disabling hardware bus redirection for Microsoft RDP may be different from the steps for disabling hardware bus redirection for VMware View. To give a few example operations, disabling instructions 124 may unmount hardware bus devices, remove kernel modules, stop daemon processes, modify the file system, and/or perform a number of similar operations depending on the protocol.

After execution of disabling instructions 124, processor 110 may then trigger redirection support determining instructions 126, which may determine whether the new remote desktop protocol supports hardware bus redirection. For example, determining instructions 126 may query a function provided by the newly-selected protocol that indicates whether hardware bus redirection can be enabled for the protocol.

Redirection enabling instructions 128 may then selectively enable hardware bus redirection for the new protocol based on whether the new protocol supports hardware bus redirection, as determined by determining instructions 126. For example, when determining instructions 126 determine that hardware bus redirection is supported, enabling instructions 128 may then enable hardware bus redirection for the new protocol. Conversely to the process for disabling hardware bus redirection, enabling instructions 128 may mount hardware bus devices, add kernel modules, start daemon processes, modify the system, and/or perform a number of similar operations. As with disabling instructions 124, enabling instructions 128 may be customized for each protocol. After enabling instructions 128 enable hardware bus redirection, a user of computing device 100 may then access the hardware bus devices from within the remote desktop session established with a server using the new protocol.

Alternatively, when determining instructions 126 determine that hardware bus redirection is not supported for the new protocol, enabling instructions 128 may instead enable access of the hardware bus devices by a local operating system of client computing device 100. For example; enabling instruction 128 may transfer control of the hardware devices to the local operating system by relying on traditional hardware bus redirection drivers running within the operating system. As a result, a user of computing device 100 may then access the hardware bus devices directly via an operating system of device 100, rather than via a redirection procedure.

Figure 2:
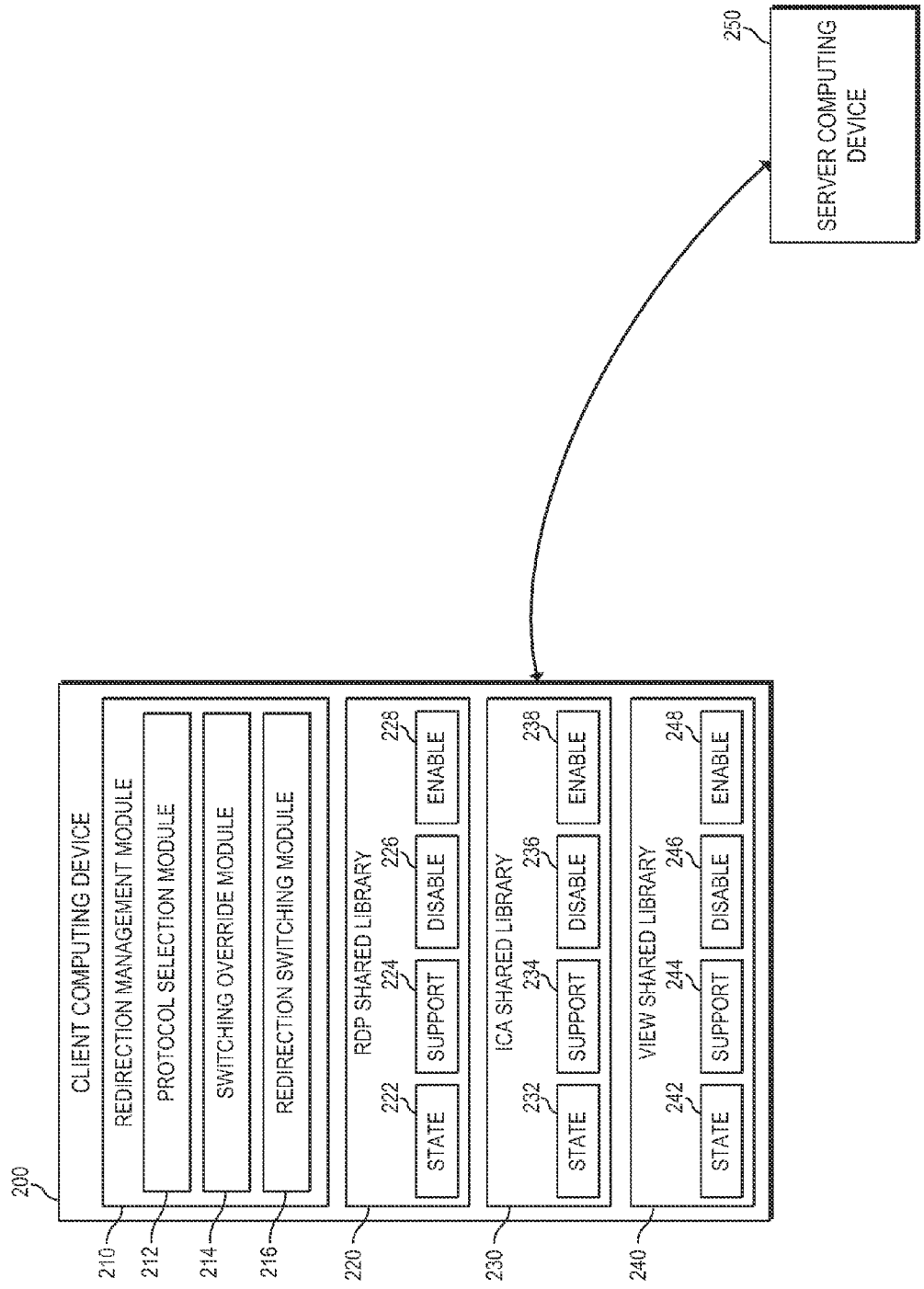
FIG. 2 is a block diagram of an example client computing device for hardware bus redirection switching, the client computing device executing functions included in a plurality of libraries.

FIG. 2 is a block diagram of an example client computing device 200 for hardware bus redirection switching, the client computing device 200 executing functions included in a plurality of libraries 220, 230, 240. As illustrated, client device 200 may be in communication with a server computing device 250 for enabling hardware bus redirection.

Client computing device 200 may include a number of modules 210, 212, 214, 216 and libraries 220, 230, 240 for switching between hardware bus redirection methods for the protocols supported by client 200. Each of the modules and libraries may include, for example, a series of instructions encoded on a machine-readable storage medium of client 200 and executable by a processor. In addition or as an alternative, each module and library may be one or more hardware devices including electronic circuitry for implementing the functionality described below.

Redirection management module 210 may manage the process for switching hardware bus redirection between protocols by executing functions included in the plurality of libraries 220, 230, 240. Management module 210 may include a protocol selection module 212, switching override module 214, and redirection switching module 216.

Protocol selection module 212 may be configured to receive a user selection of a protocol to be used for communication with server computing device 250. For example, as described above in connection with new protocol selection receiving instructions 122 of FIG. 1, protocol selection module 212 may display a user interface that allows a user to select from a plurality of protocols. Upon selection of a new protocol to be used for communication with server 250, protocol selection module 212 may communicate the user's selection to switching override module 214 and redirection switching module 216.

Switching override module 214 may allow a user to lock the hardware bus redirection technique and thereby prevent redirection switching module 216 from changing the hardware bus redirection technique when the user selects a new protocol. To this end, switching override module 214 may provide a user interface that allows a user to indicate that switching of the hardware bus redirection technique should be disabled and to specify a particular hardware bus redirection methodology to be used at all times. For example, the user may specify that redirection should be entirely disabled, such that all hardware bus devices are directly accessed by the local operating system of client 200. Alternatively, the user may specify that hardware bus redirection should only be used for a particular protocol. For example, the user may specify that hardware bus redirection technique should be locked to the technique for RDP, ICA, or View.

When the user selects a new protocol based on interaction with protocol selection module 212, switching override module 214 may first determine whether switching of the hardware bus redirection technique is overridden (i.e., disabled).

If so, switching override module 214 may then execute instructions for ensure that the redirection technique is locked to the user-specified protocol or to local access only, depending on the user's selection. For example, if the user has locked the switching technique to a particular protocol, override module 214 may call the enable function 228, 238, 248 for the selected protocol. Conversely, if the user has selected local access of hardware bus devices, override module 214 may execute instructions that disable hardware bus redirection and enable access of the devices by the local operating system of client 200. It should be noted that, in some situations, the override technique specified by the user may already be enabled; in such situations, switching override module 214 may simply exit.

Alternatively, assuming that hardware bus redirection switching is not overridden or disabled, redirection management module 210 may then trigger redirection switching module 216, which may control the process for switching the bus redirection technique to correspond to the newly-selected protocol. Thus, switching module 216 may first call the state function 222, 232, 242 for each protocol to determine which protocol is currently using hardware bus redirection. After identifying the current protocol, switching module 216 may then call the disable function 226, 236, 246 for the current protocol and thereby disable hardware bus redirection for that protocol.

Next, switching module 216 may determine whether the new protocol supports hardware bus redirection by calling the support function 224, 234, 244 for the new protocol. If the new protocol supports hardware bus redirection, switching module 216 may then call the enable function 228, 238, 248 for the new protocol, thereby enabling hardware bus redirection for that protocol. Alternatively, if the new protocol does not support hardware bus redirection, switching module 216 may instead enable local access of the hardware bus devices by the local operating system of client 200.

As illustrated, each library 220, 230, 240 may correspond to a respective protocol. Thus, library 220 corresponds to the Microsoft RDP protocol, library 230 corresponds to the Citrix ICA protocol, and library 240 corresponds to the VMware View protocol. Each library may be, for example, a Dynamic Link Library (DLL) or any other collection of instructions containing functions suitable for a particular protocol. Because the functions described below are included in libraries corresponding to each protocol, an administrator can easily enable redirection switching for a new protocol by adding a shared library for that protocol.

As referenced above, each library 220, 230, 240 may include a series of functions for use by redirection management module 210 in switching hardware bus redirection between protocols. Thus, each library may include a state function 222, 232, 242 that specifies whether the corresponding protocol is currently using hardware bus redirection. Thus, the state function 222 in ROP shared library 220 returns a value indicating whether hardware bus redirection is currently enabled for ROP, state function 232 indicates whether redirection is enabled for ICA, and state function 242 indicates whether redirection is enabled for View.

Each library 220, 230, 240 may also include a support function 224, 234, 244 that indicates whether hardware bus redirection is supported for the corresponding protocol. Thus, support function 224 in RDP shared library 220 returns a value indicating whether RDP supports hardware bus redirection, support function 234 indicates whether redirection is supported for ICA, and support function 244 indicates whether redirection is supported for View.

The implementation of support function 224, 234, 244 may vary by embodiment. In some implementations, support function 224, 234, 244 may access a constant value indicating whether hardware bus redirection is supported for the corresponding protocol. For example, each support function 224, 234, 244 may be preconfigured to a return either "True" or "False" depending on whether the protocol supports hardware bus redirection.

In other implementations, support function 224, 234, 244 may dynamically determine whether hardware bus direction is supported for the corresponding protocol by inspecting a configuration of client computing device 200. For example, support function 224, 234, 244 may inspect predetermined locations in the file system of client 200, access system state variables, or otherwise determine in real time whether the hardware bus redirection can be enabled for the corresponding protocol.

Each library 220, 230, 240 corresponding to a protocol that supports hardware bus redirection may further include a disable function 226, 236, 246 and an enable function 228, 238, 248. Disable functions 226, 236, 246 may include instructions for disabling hardware bus redirection for ROP, ICA, and View, respectively. For example, disable functions 226, 236, 246 may unmount hardware bus devices, remove kernel modules, stop daemon processes, modify the file system, and/or perform a number of similar operations depending on the particular protocol. Similarly, enable functions 228, 238, 248 may include instructions for enabling hardware bus redirection for RCDP, ICA, and View, respectively. For example, enable functions, 228, 238, 248 may mount hardware bus devices, add kernel modules, start daemon processes, modify the file system, and/or perform a number of similar operations.

Figure 3:
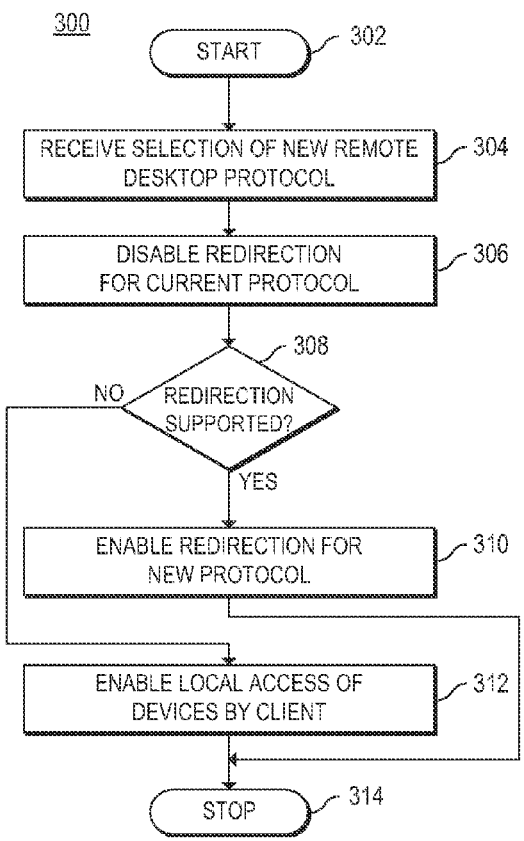
FIG. 3 is a block diagram of an example method for hardware bus redirection switching.

FIG. 3 is a block diagram of an example method 300 for hardware bus redirection switching. Although execution of method 300 is described below with reference to client computing device 100, other suitable components for execution of method 300 will be apparent to those of skill in the art (e.g., client computing device 200). Method 300 may be implemented in the form of executable instructions stored on a machine-readable storage medium, such as storage medium 120, and/or in the form of electronic circuitry.

Method 300 may start in block 302 and proceed to block 304, where client computing device 100 may receive a selection of a new remote desktop protocol to be used for communication with a remote server. For example, an administrator or other entity may specify that client computing device 100 should switch from a current protocol to a new protocol for communicating with the server. In block 306, client computing device 100 may then disable hardware bus redirection for the protocol that is currently utilizing hardware bus redirection, as the use of bus redirection for multiple protocols simultaneously may result in conflicts.

In block 308, client computing device 100 may then determine whether the new protocol supports hardware bus redirection. If so, in block 310, client computing device 100 may then enable hardware bus redirection for the protocol selected in block 304. Example operations performed to enable hardware bus redirection are described above in connection with enabling instructions 128 of FIG. 1. Alternatively, if the new protocol does not support hardware bus redirection, in block 312, client computing device 100 may enable access of hardware bus devices by the local operating system of client computing device 100. Example operations performed to enable local access of the devices are also described above in connection with enabling instructions 128 of FIG. 1. After enabling hardware bus redirection for the new protocol in block 310 or enabling local access of bus devices in block 312, method 300 may then stop in block 314.

Figure 4:
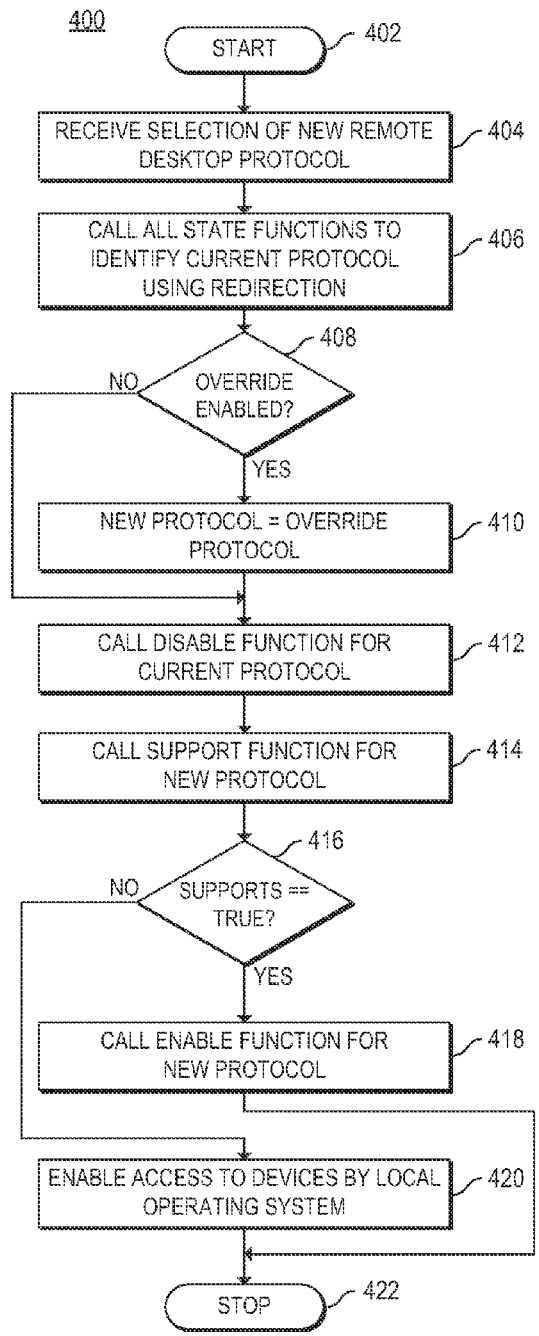
FIG. 4 is a block diagram of an example method for hardware bus redirection switching based on execution of functions included in a plurality of libraries.

FIG. 4 is a block diagram of an example method 400 for hardware bus redirection switching based on execution of functions included in a plurality of libraries. Although execution of method 400 is described below with reference to client computing device 200, other suitable components for execution of method 400 will be apparent to those of skill in the art. Method 400 may be implemented in the form of executable instructions stored on a machine-readable storage medium and/or in the form of electronic circuitry.

Method 400 may start in block 402 and proceed to block 404, where client computing device 200 may receive a selection of a new remote desktop protocol to be used for communication with a server computing device 250. Next, in block 406, client computing device 200 may call all available state functions 222, 232, 242 to identify the protocol that is currently using hardware bus redirection. For example, client computing device 200 may sequentially call state function 222 of RDP shared library 220, state function 232 of ICA shared library 230, and state function 242 of View shared library 240. In this manner, client computing device 200 may determine which protocol, if any, is currently using the hardware bus redirection functionality.

In block 408, client computing device 200 may then determine whether an administrator or other entity has overridden hardware bus redirection switching. For example, client computing device 200 may access a variable in a predetermined location that indicates whether hardware bus redirection should be locked to a particular protocol or locked to local access by the local operating system. If so, method 400 may continue to block 410, where client computing device 200 may set a "new protocol" variable to the override protocol. In this manner, the steps described below with reference to block 412 through 420 are executed with respect to the override protocol. Otherwise, if hardware bus redirection switching has not been overridden, method 400 may skip directly to block 412.

In block 412, client computing device 200 may call the disable function 226, 236, 246 for the current protocol identified in block 406. For example, if RDP is currently using hardware bus redirection, client computing device 200 may call disable function 226 included in RDP shared library 220. Similarly, if ICA is currently using hardware bus redirection, client computing device 200 may call disable function 236 included in ICA shared library 230. Finally, if View is currently using hardware bus redirection, client computing device 200 may call disable function 246 included in View shared library 240.

After disabling hardware bus redirection for the current protocol, client computing device 200 may then call the support function for the new protocol in block 414. As detailed above, each support function 224, 234, 244 may return a value indicating whether the protocol supports hardware bus redirection. Thus, client computing device 200 may call the support function 224 for RDP, the support function 234 for ICA, or the support function 244 for View, depending on which protocol the user selected as the new protocol in block 404.

Then, in block 416, client computing device 200 may determine whether the new protocol supports hardware bus redirection based on the value returned by the corresponding support function 224, 234, 244. When client 200 determines that the new protocol supports hardware bus redirection, client computing device 200 may then call the enable function 228, 238, 248 for the new protocol in block 418. In particular, client 200 may call enable function 228 when the new protocol is RDP, enable function 238 when the new protocol is ICA, and enable function 248 when the new protocol is View. Alternatively, when client 200 determines that the new protocol does not support hardware bus redirection, client computing device 200 may instead enable access to the hardware bus devices by a local operating system. After enabling hardware bus redirection in block 418 or enabling local access of devices in block 420, method 400 may stop in block 422.

According to the foregoing, example embodiments disclosed herein provide for switching hardware bus redirection for multiple protocols supported within a remote desktop environment. For example, example embodiments allow for seamless switching between hardware bus redirection methods when an administrator or other entity selects a new protocol be used by the client device. Such embodiments enable the client to reliably switch between protocols without negatively affecting the functionality of hardware bus redirection.

We claim:

1. A computing device for hardware bus redirection switching, the computing device comprising:
   a processor to:
   receive a selection of a new remote desktop protocol to be used by the computing device for communication with a remote server,
   disable hardware bus redirection for a current remote desktop protocol being used for hardware redirection with the remote server, wherein hardware bus redirection is the remote desktop transmitting data from a device connected to a local hardware bus of the remote desktop to the remote server before the data is returned to the remote desktop upon the remote desktop attempting to access to the device, and
   selectively enable hardware bus redirection for the new remote desktop protocol based on whether the new remote desktop protocol supports hardware bus redirection.

2. The computing device of claim 1, wherein, to selectively enable hardware bus redirection, the processor is configured to:
   enable hardware bus redirection for the new remote desktop protocol when it is determined that hardware bus redirection is supported for the new protocol, and
   enable access of hardware bus devices by a local operating system of the computing device when it is determined that hardware bus redirection is not supported for the new protocol.

3. The computing device of claim 1, wherein the processor is configured to execute functions included in a plurality of libraries, each library corresponding to a respective protocol and comprising a support function to indicate whether the respective protocol supports hardware bus redirection.

4. The computing device of claim 3, wherein the support function accesses a constant value indicating whether hardware bus redirection is supported for the respective protocol.

5. The computing device of claim 3, wherein the support function includes instructions for dynamically determining whether hardware bus redirection is supported for the respective protocol by inspecting a configuration of the computing device.

6. The computing device of claim 3, wherein:
   each library further comprises a state function indicating whether the respective protocol is currently using hardware bus redirection, and
   the processor executes the state function for all protocols to identify the remote desktop protocol currently using hardware bus redirection.

7. The computing device of claim 3, wherein each library corresponding to a protocol that supports hardware bus redirection further comprises:
   a disable function for disabling hardware bus redirection for the respective protocol, and
   an enable function for enabling hardware bus redirection for the respective protocol.

8. The computing device of claim 1, wherein the processor is further configured to:
   determine whether hardware bus redirection switching is overridden, and
   execute the disabling for the current remote desktop protocol and selectively enabling for the new remote desktop protocol when hardware bus redirection switching is not overridden.

9. A non-transitory, machine-readable storage medium encoded with instructions executable by a processor of a computing device for hardware bus redirection switching, the non-transitory, machine-readable storage medium comprising:
   instructions for receiving a selection of a new remote desktop protocol to be used for communication with a remote server, wherein hardware bus redirection is the remote desktop transmitting data from a device connected to a local hardware bus of the remote desktop to the remote server before the data is returned to the remote desktop upon the remote desktop attempting to access to the device;
   instructions for determining whether the new remote desktop protocol supports hardware bus redirection;
   instructions for enabling hardware bus redirection for the new remote desktop protocol when it is determined that hardware bus redirection is supported for the new protocol; and
   instructions for enabling access of hardware bus devices by a local operating system of the computing device when it is determined that hardware bus redirection is not supported for the new protocol.

10. The non-transitory, machine-readable storage medium of claim 9, further comprising:
    instructions for disabling hardware bus redirection for a current remote desktop protocol using hardware bus redirection prior to enabling hardware bus redirection for the new remote desktop protocol.

11. The non-transitory, machine-readable storage medium of claim 9, further comprising:
    a plurality of libraries, each library corresponding to a respective protocol and comprising a support function for indicating whether hardware bus redirection is supported for the respective protocol,
    wherein each library corresponding to a protocol that supports hardware bus redirection further comprises the instructions for enabling hardware bus redirection for the respective protocol.

12. A method for execution by a computing device for switching hardware bus redirection for remote desktop protocols, the method comprising:
    disabling, by the computing device, hardware bus redirection for a currently-executing remote desktop protocol in response to selection of a new remote desktop protocol, wherein hardware bus redirection is the remote desktop transmitting data from a device connected to a local hardware bus of the remote desktop to the remote server before the data is returned to the remote desktop upon the remote desktop attempting to access to the device;
    determining whether the new remote desktop protocol supports hardware bus redirection; and
    enabling hardware bus redirection for the new remote desktop protocol when it is determined that the new remote desktop protocol supports hardware bus redirection.

13. The method of claim 12, further comprising:
    enabling access of hardware bus devices by a local operating system of the computing device when it is determined that the new remote desktop protocol does not support hardware bus redirection.

14. The method of claim 12, wherein the disabling comprises accessing a hardware bus redirection disable function included in a library corresponding to the currently-executing remote desktop protocol.

15. The method of claim 12, wherein:
    the determining comprises accessing a support function included in a library corresponding to the new remote desktop protocol, the support function returning a value indicating whether hardware bus redirection is supported for the new protocol, and
    the enabling comprises accessing a hardware bus redirection enable function included in the library corresponding to the new remote desktop protocol.

* * * * *